A. H. RADFORD.
CALCULATING DEVICE.
APPLICATION FILED APR. 27, 1921.

1,410,119.

Patented Mar. 21, 1922.
2 SHEETS—SHEET 1.

ALPHONSE. H. RADFORD, Inventor

By A. V. Groupe

Attorney

A. H. RADFORD.
CALCULATING DEVICE.
APPLICATION FILED APR. 27, 1921.

1,410,119.

Patented Mar. 21, 1922.
2 SHEETS—SHEET 2.

Fig. 2.

ALPHONSE H. RADFORD, Inventor

UNITED STATES PATENT OFFICE.

ALPHONSE H. RADFORD, OF PHILADELPHIA, PENNSYLVANIA.

CALCULATING DEVICE.

1,410,119.  Specification of Letters Patent.  Patented Mar. 21, 1922.

Application filed April 27, 1921. Serial No. 464,956.

*To all whom it may concern:*

Be it known that I, ALPHONSE H. RADFORD, a citizen of the United States, residing at Philadelphia, in the county of Philadelphia and State of Pennsylvania, have invented certain new and useful Improvements in Calculating Devices, of which the following is a specification.

The object of my invention is to provide a novel calculating device by means of which certain calculations may be made with much less time and effort than has been possible with the aid of the means and devices heretofore used to attain the same ends.

The invention aims to reduce the time and effort which has been required to ascertain the total number of elemental parts and fractions thereof of quantities of such parts and their fractions represented by a plurality of factors each of which represents a certain number of like quantities which differ from quantities represented by other factors, the elemental parts of different quantities thereof represented by different factors being governed by or ascertainable from different fixed values existing between different elements of a series thereof which is common to all the factors.

The invention may be employed in widely varying fields for many useful purposes among which is calculating the total number of miles and the fractions thereof represented by the tickets used by passengers traveling varying distances, in both directions, over a railroad, between different stations thereof, where the stations are numerous.

With the foregoing object in view, the invention consists in the novel combination and arrangement of the elements of the device, as will be hereinafter described and claimed.

In the accompanying drawing,

Figure 2 is a view similar to Fig. 1 after placing thereon certain figures in reaching a conclusion by the aid of the device, as will be hereinafter explained.

Figure 1:
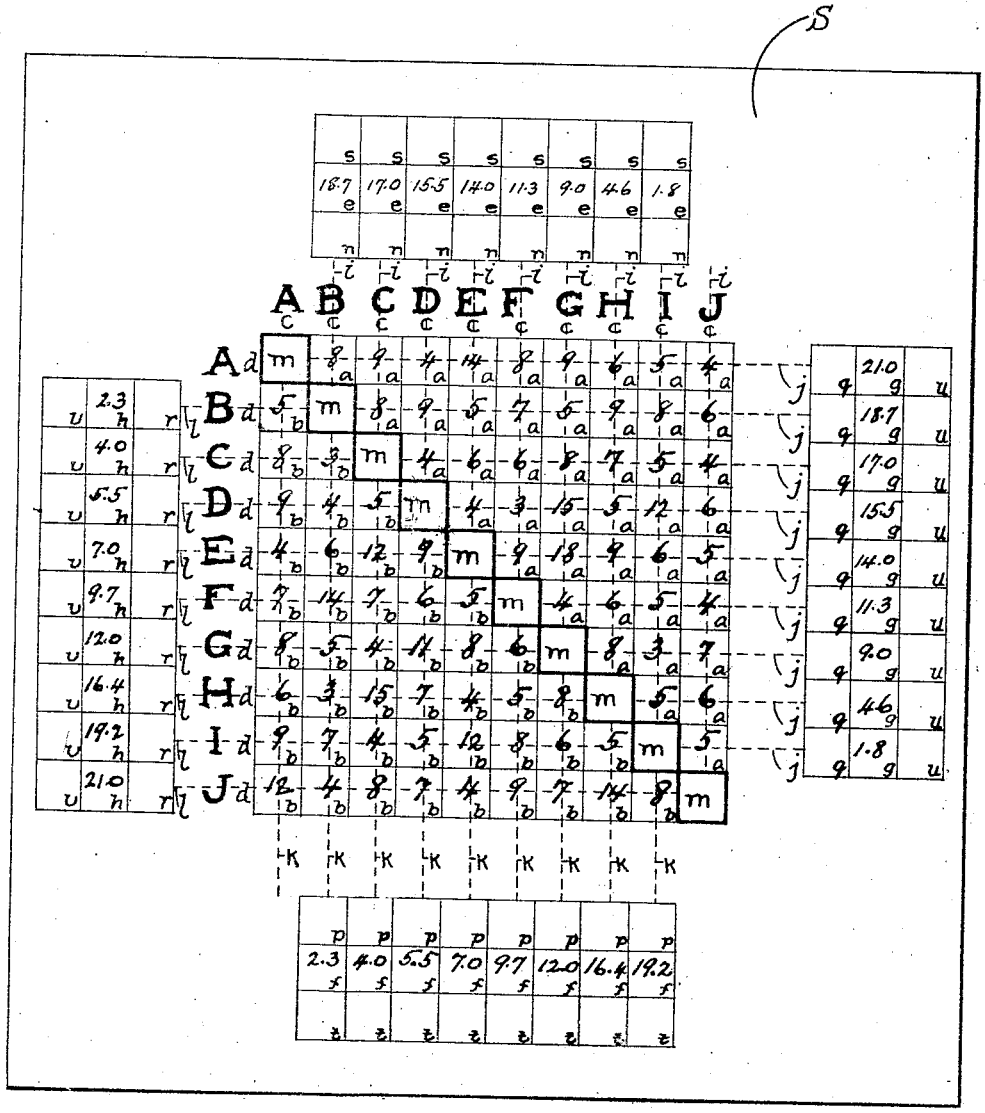
Figure 1 is a face view of a calculating device embodying my invention.

Referring to the drawings, S designates a sheet of paper or other suitable material having inscribed on its face the following elements; a first group of numerals or factors $a$, a second group of numerals or factors $b$, a first series of designators $c$, a second series of designators $d$, a first short series of multipliers $e$, a second short series of multipliers $f$, a first long series of multipliers $g$ and a second long series of multipliers $h$.

The first series of designators $c$ are arranged in a certain prescribed order from a commencing designator A to a terminal designator J; and the second series of designators $d$ correspond in number and character with the designators of the series $c$, and they are arranged in like order from a commencing designator A to a terminal designator J.

The factors of the first group $a$ thereof are arranged in a set of vertical lines $i$ and a set of horizontal lines $j$ which cross the vertical lines $i$, the same factors of the group $a$ being arranged in the lines of the two sets $i$ and $j$ and in the regions where the lines cross each other; and the factors of the second group $b$ thereof are arranged in a set of vertical lines $k$ and a set of horizontal lines $l$ which cross the vertical lines $k$, the same factors of the group $b$ being arranged in the lines of the two sets $k$ and $l$ and in the regions where the lines cross each other.

To quickly and properly locate the factors $a$ and $b$ in the sets of lines $i$, $j$ and $k$, $l$, respectively, thereof, I inscribe upon the face of the sheet S intersecting vertical and horizontal lines enclosing squares or other suitably shaped fields arranged in horizontal and vertical rows and divided by a diagonally directed row $m$ thereof into first and second groups or sections containing the factors $a$ and $b$, respectively.

Each set of factor lines $i$, $j$, $k$, $l$ have the factors thereof progressively increasing in number; the two sets of factor lines $i$ and $k$, omitting the long factor line $k$ at the left hand side of the set thereof and the long factor line $i$ at the right hand side of the set thereof, are arranged opposite to or form, in effect, continuations of each other inversely of the order in which their factors increase in number; and the two sets of factor lines $j$ and $l$, omitting the long factor line $j$ at the top of the set thereof and the long factor line $l$ at the bottom of the set thereof, are arranged opposite to or form, in effect, continuations of each other inversely of the order in which their factors increase in number.

The designators of the first series $c$ thereof are related to the vertical lines of factors $i$ and $k$, one designator to a line of each set, omitting the commencing designator A for the set of factor lines $i$, and omitting the terminal designator J for the set of factor lines $k$, the series of designators $c$ extending from its commencing designator A to its terminal designator J through the two sets of factor lines $i$ and $k$ in the order in which the factors of the lines $i$ increase in number, and inversely of the order in which the factors of the lines $k$ increase in number.

The designators of the second series $d$ thereof are related to the horizontal lines of factors $j$ and $l$, one designator to a line of each set, omitting the terminal designator J for the set of factor lines $j$, and omitting the commencing designator A for the set of factor lines $l$, the series of designators $d$ extending from its commencing designator A to its terminal designator J through the two sets of factor lines $j$ and $l$ inversely of the order in which the factors of the lines $j$ increase in number, and in the order in which the factors of the lines $l$ increase in number.

The set of factor lines $i$ of the factor group $a$ and the set of factor lines $l$ of the factor group $b$ have the factors thereof progressively increasing in number from the commencing designator A to the terminal designator J of each series $c$ and $d$; and the set of factor lines $j$ of the factor group $a$ and the set of factor lines $k$ for the factor group $b$ have the factors thereof progressively increasing in number from the terminal designator J to the commencing designator A of each series $c$ and $d$.

For convenience of reading, the series of designators $c$ are arranged in a horizontal line above the vertical rows of squares containing the factors, one above each vertical row of squares, and also in alinement with the lines of factors $i$ and $k$, and the series of designators $d$ are arranged in a vertical line adjacent to one end of the horizontal rows of squares containing the factors, one adjacent to each horizontal row of squares, and also in alinement with the lines of factors $j$ and $l$.

The first short series of multipliers $e$ correspond in number, less two, with the series of designators $c$ and they are related thereto one to each designator $c$ and its factor line $i$, omitting the commencing designator A and the terminal designator J and its corresponding factor line $i$; and the second short series of multipliers $f$ correspond in number, less two, with the series of designators $c$ and they are related thereto one to each designator $c$ and its factor line $k$ omitting the terminal designator J and the commencing designator A and its corresponding factor line $k$.

The first long series of multipliers $g$ correspond in number, less one, with the series of designators $d$, and they are related thereto one to each designator $d$ and its factor line $j$, omitting the terminal designator J; and the second long series of multipliers $h$ correspond in number, less one, with the series of designators $d$, and they are related thereto one to each designator $d$ and its factor line $l$, omitting the commencing designator A.

For convenience of reading, the multipliers of the four series thereof $e$, $f$, $g$ and $h$ are arranged opposite to or in alinement with the lines of factors and the designators of the two series thereof to which they are related, as hereinbefore described.

Each multiplier of the short and long series thereof $e$ and $g$ related to the factor lines $i$ and $j$, respectively, of the first factor group $a$ represent a fixed value existing between its designator and the terminal designator of its series, and the multipliers $e$ and $g$ progressively increase in value toward the commencing designators of their series $c$ and $d$, respectively; and each multiplier of the short and long series thereof $f$ and $h$ related to the factor lines $k$ and $l$, respectively, of the second factor group $b$ represent a fixed value existing between its designator and the commencing designator of its series, and the multipliers $f$ and $h$ progressively increase in value toward the terminal designators of their series $c$ and $d$, respectively.

The two series of designators $c$ and $d$ are alike in every particular excepting their relation to the lines of factors and the multipliers and they designate or represent precisely the same series of things having the same values existing between them.

There exists between the commencing designator A and the terminal designator J of each series thereof an entire fixed value equal to the value expressed by the highest multiplier of the two long series $g$ and $h$ thereof and this entire fixed value is divided into quantities of elemental parts and fractions thereof by the designators which intervene between the commencing designator A and the terminal designator J of each series thereof. Such divisions of the entire value exist between adjacent designators, and the part of the entire fixed value between any two next adjacent designators of either series $c$ and $d$ thereof is the difference in value between the two multipliers, related thereto or aligned therewith, of any one of the four series of multipliers $e$, $f$, $g$ and $h$; in other words, the difference in value between each two adjacent multipliers of each of the series $e$, $f$, $g$ and $h$ thereof represent a fixed value existing between the designators $c$ and $d$ related thereto or alined therewith.

Each factor numeral of each group $a$ and $b$ stands for and expresses a number of quantities of either the entire fixed value between the commencing designator A and the terminal designator J or a fractional part of the entire value existing between two of the designators, in accordance with the position of the factor in the vertical and horizontal lines thereof and its relation to or alinement with the designators of the two series $c$ and $d$ thereof, as hereinafter explained.

For convenience in using the device, I inscribe on the sheet S certain lines enclosing the multipliers of the four series thereof $e$, $f$, $g$ and $h$, and enclosing rows of squares or suitably shaped fields $n$, $p$, $q$, $r$, $s$, $t$, $u$ and $v$, two adjacent to each multiplier and alined therewith and with their related designators and lines of factors, as shown in the drawings.

I shall now describe the manner in which the device is used to accomplish its object in connection with calculating the total number of miles and fractions thereof represented by the tickets issued from different stations of a railroad within a given period of time for travel, in both directions over the same, between many varying stations as starting and finishing points. When the device is used in this connection, the stations of the railroad will constitute and be arranged in the series of designators $c$ in the order in which they occur from the commencing station to the terminal station of the railroad and the actual names of the stations will be used in lieu of the alphabetical designators shown in the drawings. We may, therefore, assume that the stations are named A, B, C, D, etc., from the commencing station A to the terminal station J of the first series $c$ thereof. The second series $d$ thereof is precisely like the first series, excepting as to their position on the sheet S, standing for and representing precisely the same things that the first series $c$ stands for and represents.

The numerals of the long series of multipliers $h$ stand for and express the distances in miles and fractions thereof between their respective stations $d$ and the commencing station A; i. e., 2.3 miles between A and B, 4.0 miles between A and C, 5.5 miles between A and D, and so on throughout the series $h$, the highest multiplier of the series expressing the length of the railroad or the distance between the commencing station A and the terminal station J. Inversely, the numerals of the series of multipliers $g$ stand for and express the distances in miles and fractions thereof between the respective stations $d$ and the terminal station J; i. e., 1.8 miles between J and I, 4.6 miles between J and H, 9.0 miles between J and G, and so on throughout the series $g$, the highest multiplier of the series $g$ being the same as the highest multiplier of the series $h$ and expressing the length of the railroad or the distance between the terminal station J and the commencing station A.

The numerals of the short series of multipliers $f$ stand for and express the distances in miles and fractions thereof between their respective stations $c$ and the commencing station A, omitting the terminal station J; and the numerals of the short series of multipliers $e$ stand for and express the distances in miles and fractions thereof between their respective stations $c$ and the terminal station J.

It will now be understood that the difference in miles between each two adjacent multipliers of the series $e$, $f$, $g$ and $h$ thereof is the distance between the two adjacent stations related thereto or alined therewith.

Now, the total number of tickets issued from each station of the railroad during the period of time being accounted for is represented by the sum of the two groups of factor numerals placed within the squares $a$ and $b$; and these two groups of factor numerals are placed within the squares and related to the duplicate series of stations $c$ and $d$ in accordance with the relation of the tickets thereto as follows: All tickets issued from station A are placed by representative factor numerals in the vertical row of squares $b$ beneath or alined with station A of the first series $c$, all tickets issued from station B are placed in the vertical row of squares $a$ and $b$ beneath or alined with station B of the first series $c$, all tickets issued from station C are placed in the vertical row of squares $a$ and $b$ beneath or alined with station C, and so on to the end of the series of stations. The tickets issued from each station of the series $c$ are placed opposite to or in alinement with the stations of the series $d$ to which they are issued; in other words A station issues 5 tickets to B, 8 tickets to C, 9 tickets to D, 4 tickets to E, 7 tickets to F, 8 tickets to G, 6 tickets to H, 9 tickets to I, and 12 tickets to J, and the representative factor numerals of these ticket issues are placed within the first vertical row of squares $b$, as shown in the drawings; B station issues 8 tickets to A, 3 tickets to C, 4 tickets to D, 6 tickets to E, 14 tickets to F, 5 tickets to G, 3 tickets to H, 7 tickets to I, and 4 tickets to J, and the representative factor numerals of these tickets are placed within the second vertical row of squares $a$ and $b$; and so on to the end of the series of stations $c$, the representative factor numerals of the tickets issued therefrom are placed beneath the same and in alinement with the stations of the series $d$ to which they are issued.

It will thus be seen that each ticket-representing factor-numeral of the two groups $a$ and $b$ stands for and represents a corresponding number of miles, or miles and fractions thereof, between the two stations of the series $c$ and $d$ related thereto or alined vertically and horizontally therewith.

Now, having placed the ticket representing factor-numerals in the squares of the two groups $a$ and $b$, as described, and thereby completed the calculating device for the railroad work, the calculation is proceeded with as follows: The factors of each line of the four sets thereof $i$, $j$, $k$ and $l$ are added together, and the sums of the respective lines of the sets $i$, $j$, $k$ and $l$ are placed within the adjacent squares $n$, $q$, $p$ and $r$ which are alined therewith, respectively, as shown in Fig. 2. The respective sums entered in the squares $n$, $q$, $p$ and $r$ are multiplied by the multipliers of the sets $e$, $g$, $f$ and $h$ which are alined therewith, respectively, and the products resulting therefrom are placed within the adjacent squares $s$, $u$, $t$ and $v$ which are alined therewith, respectively, as shown in Fig. 2. The products within the squares $s$ and $t$ from the two short series of multipliers $e$ and $f$, respectively, are added together in any convenient manner, and the sum $w$ thereof is placed upon the sheet S. The products within the squares $u$ and $v$ from the two long series of multipliers $g$ and $h$, respectively, are added together in any convenient manner, and the sum $y$ thereof is placed upon the sheet S over the sum $w$. The sum $w$ is now subtracted from the sum $y$ and the result $z$ is the total number of miles represented by the tickets, or numerals of the two groups $a$ and $b$, or the total number of miles traveled by the passengers using the tickets.

I have discovered that the calculating device shown and described herein permits the result described herein to be reached in much less time and with much less effort than is required with the use of the means heretofore employed for the same purpose; the saving in time and effort being accomplished by the reduction of space occupied by the work, the reduction of the number of entries of designators or stations, the reduction of the number of entries of multipliers or distances, the reduction of the number of additions of figures and, particularly, the great reduction of the number of multiplications of figures. The proportionate saving of time and effort is greatly increased with the increase in the number of designators or stations of the series thereof, and, when it is considered that the number of stations of a railroad line is usually greatly in excess of the number of designators or stations shown and described herein, the value of the device and the great saving effected thereby in railroad and analogous work will be appreciated.

The reduction of the work necessary to accomplish the end correspondingly reduces the chance of errors occurring in the work, and correspondingly reduces the time necessary to locate the errors when they do occur.

I claim as my invention:—

1. A graphic calculating device comprising a sheet having inscribed on its face a first series of designators arranged in prescribed order from a commencing designator to a terminal designator; a second series of like designators arranged in like order from a commencing designator to a terminal designator; a first group and a second group of factors representing numbers of quantities of elemental parts of fixed values existing between designators of each of said series, each group being arranged in two sets of lines which cross each other, the same factors of each group being arranged in the lines of each of its sets and individually in the regions where the lines cross each other, one set of lines of each group being stationed in the relation of one line to a designator of the first series thereof, the other set of lines of each group being stationed in the relation of one line to a designator of the second series, one set of factor lines of each factor group having the factors thereof progressively increasing in number from the commencing to the terminal designator of each series thereof, and the other set of factor lines of each factor group having the factors thereof progressively increasing in number from the terminal to the commencing designator of each series thereof; a long series of multipliers for one set of factor lines of each factor group, the multipliers of each long series being stationed in the relation of one multiplier to a line of its sets of factor lines and one multiplier to a designator of the first series thereof, omitting the commencing designator for the factor lines of one factor group and omitting the terminal designator for the factor lines of the other factor group; a short series of multipliers for the other set of factor lines of each factor group, the multipliers of each short series being stationed in the relation of one multiplier to a line of its set of factor lines and one multiplier to a designator of the second series thereof, omitting the commencing and terminal designators for the factor lines of each group; each multiplier of the short and long series thereof, related to the first factor group, representing a fixed value between its designator and the terminal designator of its series, the multipliers progressively increasing in value toward the commencing designator; and each multiplier of the short and long series thereof related to the second factor group representing a fixed value between its designator and the commencing designator of its series, the multipliers progressively increasing in value toward the terminal designator; the difference in value between each two adjacent multipliers of each of the long and short series thereof representing a fixed value existing between their designators; whereby the total number of elemental parts of the quantities thereof represented by the factors of the two groups may be ascertained by multiplying, by the multipliers of one long series and one short series, the sums of the factors of the lines thereof of the first group related thereto, by multiplying by the multipliers of the other long series and the other short series, the sums of the factors of the lines thereof of the second group related thereto, and subtracting the sum of the products of the two short series of multipliers from the sum of the products of the two long series of multipliers.

2. A graphic calculating device comprising a sheet having inscribed thereon vertical and horizontal intersecting lines enclosing squares arranged in vertical and horizontal rows or lines; a vertical series of designators corresponding in number with the horizontal rows of squares and stationed one adjacent to each horizontal row and arranged in prescribed order from a commencing designator to a terminal designator; a horizontal series of like designators corresponding in number with the vertical rows of squares and stationed one adjacent to each vertical row and arranged in like order from a commencing designator to a terminal designator; said rows of squares being divided by a diagonal row thereof into two divisions; a first group of factors individually occupying individual squares of one division thereof; a second group of factors individually occupying individual squares of the other division thereof; the factors of each group representing numbers of quantities of elemental parts of fixed values existing between designators of each of said series; a long vertical series of multipliers for each group of factors, stationed one adjacent to each horizontal row of squares and one adjacent to each designator of the vertical series, omitting the commencing designator and the top row for the series of multipliers of one group and omitting the terminal designator and the bottom row for the series of multipliers of the other group; a short horizontal series of multipliers for each group of factors, stationed one adjacent to each vertical row of squares and one adjacent to each designator of the horizontal series, omitting the commencing and terminal designators and the two end rows; each multiplier of the short and long series thereof, related to the first factor group, representing a fixed value between its designator and the terminal designator of its series, the multipliers progressively increasing in value toward the commencing designator; and each multiplier of the short and long series thereof related to the second factor group representing a fixed value between its designator and the commencing designator of its series, the multipliers progressively increasing in value toward the terminal designator; the difference in value between each two adjacent multipliers of each of the long and short series thereof representing a fixed value existing between their designators; whereby the total number of elemental parts of the quantities thereof represented by the factors of the two groups may be ascertained by multiplying, by the multipliers of one long series and one short series, the sums of the vertical and horizontal rows of factors in the rows of squares of one division related thereto, by multiplying, by the multipliers of the other long series and the other short series, the sums of the vertical and horizontal rows of factors in the rows of squares of the other division related thereto, and by subtracting the sum of the products of the two short series of multipliers from the sum of the products of the two long series of multipliers.

ALPHONSE H. RADFORD.